(12) United States Patent
Grogg et al.

(10) Patent No.: US 10,415,481 B2
(45) Date of Patent: Sep. 17, 2019

(54) HEAT SHIELD MOUNT CONFIGURATION

(71) Applicant: UNITED TECHNOLOGIES CORPORATION, Hartford, CT (US)

(72) Inventors: Gary L. Grogg, South Berwick, ME (US); Garth J. Vdoviak, North Berwick, ME (US); Marshall Thayer, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 728 days.

(21) Appl. No.: 14/765,393

(22) PCT Filed: Mar. 6, 2014

(86) PCT No.: PCT/US2014/021094
§ 371 (c)(1),
(2) Date: Aug. 3, 2015

(87) PCT Pub. No.: WO2014/164189
PCT Pub. Date: Oct. 9, 2014

(65) Prior Publication Data
US 2016/0003161 A1    Jan. 7, 2016

Related U.S. Application Data

(60) Provisional application No. 61/775,732, filed on Mar. 11, 2013.

(51) Int. Cl.
*F02C 7/24*    (2006.01)
*F01D 25/00*    (2006.01)
(Continued)

(52) U.S. Cl.
CPC ............... *F02C 7/24* (2013.01); *F01D 25/00* (2013.01); *F01D 25/162* (2013.01);
(Continued)

(58) Field of Classification Search
CPC ........ F01D 25/08; F01D 25/14; F01D 25/145; F01D 25/26; F02C 7/24; F02C 7/00; F02C 7/06
(Continued)

(56) References Cited

U.S. PATENT DOCUMENTS 2,916,874 A * 12/1959 Worobel .................. F02C 7/20
                                                                 415/126
3,321,179 A *  5/1967 Johnson .................. F01D 5/081
                                                                 415/115
(Continued)

FOREIGN PATENT DOCUMENTS

WO    2012048934 A1    4/2012

OTHER PUBLICATIONS

Int'l Search Report from PCT /US14/021094.
(Continued)

*Primary Examiner* — Deming Wan
(74) *Attorney, Agent, or Firm* — Carlson, Gaskey & Olds, P.C.

(57) ABSTRACT

An attachment interface assembly for a gas turbine engine has a component configured for attachment to an engine static structure. A fastener has a threaded body portion and an enlarged head portion. The threaded body portion is inserted through aligned holes in the component and engine static structure. A clip has a center opening that receives the threaded body portion such that the clip is positioned between the enlarged head portion and the component.

22 Claims, 4 Drawing Sheets

(51) Int. Cl.
*F01D 25/16* (2006.01)
*F01D 25/24* (2006.01)
*F02C 7/00* (2006.01)
*F02C 7/06* (2006.01)
*F02C 7/20* (2006.01)
*F01D 25/30* (2006.01)

(52) U.S. Cl.
CPC .............. *F01D 25/243* (2013.01); *F02C 7/00* (2013.01); *F02C 7/06* (2013.01); *F02C 7/20* (2013.01); *F01D 25/30* (2013.01); *F05D 2260/30* (2013.01); *F05D 2260/31* (2013.01)

(58) Field of Classification Search
USPC .................. 415/177, 214.1, 218, 180; 416/94
See application file for complete search history.

(56) References Cited

U.S. PATENT DOCUMENTS

| | | | |
|---|---|---|---|
| 4,053,189 A | 10/1977 | Novotny | |
| 4,512,159 A | 4/1985 | Memmen | |
| 4,887,949 A * | 12/1989 | Dimmick, III | F01D 5/066 403/22 |
| 5,201,799 A | 4/1993 | Johnson | |
| 5,226,788 A * | 7/1993 | Fledderjohn | F01D 5/066 411/84 |
| 5,255,508 A | 10/1993 | David | |
| 5,265,411 A | 11/1993 | Belsom | |
| 5,339,619 A | 8/1994 | Antonellis | |
| 5,433,584 A * | 7/1995 | Amin | F01D 21/045 415/229 |
| 5,799,491 A | 9/1998 | Bell et al. | |
| 5,996,335 A | 12/1999 | Ebel | |
| 6,415,609 B1 | 7/2002 | Vacek et al. | |
| 6,463,739 B1 | 10/2002 | Mueller et al. | |
| 6,869,051 B2 | 3/2005 | Bishop | |
| 7,094,020 B2 * | 8/2006 | Dong | F01D 11/001 415/112 |
| 7,658,074 B2 | 2/2010 | Tuttle | |
| 7,967,560 B2 | 6/2011 | DiBenedetto | |
| 7,967,562 B2 | 6/2011 | Frost et al. | |
| 9,222,369 B2 * | 12/2015 | Mulcaire | F01D 25/243 |
| 2010/0316484 A1 * | 12/2010 | Jasko | F01D 9/041 415/1 |
| 2011/0126543 A1 | 6/2011 | Kirsopp et al. | |
| 2013/0011253 A1 | 1/2013 | Mulcaire | |

OTHER PUBLICATIONS

Supplementary European Search Report for European Application No. 14778227.0 completed Oct. 7, 2016.
International Preliminary Report on Patentability for International Application No. PCT/US2014/021094 dated Sep. 24, 2015.

* cited by examiner

HEAT SHIELD MOUNT CONFIGURATION

CROSS-REFERENCE TO RELATED APPLICATION

This application claims priority to U.S. Provisional Application No. 61/775,732, filed Mar. 11, 2013.

BACKGROUND

In many gas turbine engines, a low pressure spool includes a low pressure turbine that is connected to and drives a low pressure compressor, and a high pressure spool includes a high pressure turbine that is connected to and drives a high pressure compressor. Air is compressed by the compressors and communicated to a combustor section where air is mixed with fuel and ignited to generate a high pressure exhaust gas stream that expands through the turbines. Energy is extracted from the turbines to drive the compressors. The spools are mounted for rotation about an engine central longitudinal axis relative to an engine static structure via several bearing systems. The bearing systems are located within bearing compartments that include heat shields to protect components from the high temperatures of the exhaust gases.

The heat shields are typically comprised of sheet metal plates that are attached to the engine static structure with bolts. Due to the thinness of the plates, the bolts can potentially damage areas of the heat shield that come into contact with the head of the bolt during installation. This increases maintenance costs as the shields have to be replaced during overhaul service operations. Riveted-on nut plates are not preferred in hot sections of the engine because threads can seize and pull apart anti-rotation features on the plates requiring them to be drilled out. Another proposed solution is to use thicker mount flanges that are welded to the shields; however, this increases cost and weight.

SUMMARY

In a featured embodiment, an attachment interface assembly for a gas turbine engine has a component configured for attachment to an engine static structure. A fastener has a threaded body portion and an enlarged head portion. The threaded body portion is inserted through aligned holes in the component and engine static structure. A clip has a center opening that receives the threaded body portion such that the clip is positioned between the enlarged head portion and the component.

In another embodiment according to the previous embodiment, the component comprises a heat shield.

In another embodiment according to any of the previous embodiments, the engine static structure includes a circumferentially extending groove. A portion of the clip is received within the groove to axially retain the clip, fastener, and heat shield to the engine static structure.

In another embodiment according to any of the previous embodiments, the clip comprises a generally flat body portion defining the center opening and includes a plurality of gripping fingers extending outwardly from the flat body portion to grip the enlarged head portion.

In another embodiment according to any of the previous embodiments, the fastener comprises a tee-head bolt.

In another embodiment according to any of the previous embodiments, the heat shield comprises a thin sheet metal plate having a radially outer edge portion defined by a circumferentially extending mount flange having a first side and a second side. The first side is in direct abutting engagement with the engine static structure and the second side is in direct abutting engagement with the clip.

In another embodiment according to any of the previous embodiments, the engine static structure has a bearing support structure, and includes a nut threaded onto the threaded body portion to clamp the clip and heat shield between the enlarged head portion and the bearing support structure.

In another embodiment according to any of the previous embodiments, the enlarged head portion includes a plurality of linear side edges. The clip has a generally flat body portion defining the center opening and includes a plurality of gripping fingers extending outwardly from the flat body portion to grip the enlarged head portion at each of the linear side edges.

In another embodiment according to any of the previous embodiments, each gripping finger includes a bent distal end that extends over an outward facing end face of the enlarged head portion.

In another featured embodiment, a gas turbine engine assembly has at least one shaft defining an engine axis of rotation. At least one compressor and at least one turbine connect to each other by the at least one shaft. At least one bearing supports the at least one shaft for rotation about the engine axis of rotation. The bearing is positioned with a bearing compartment including a bearing support structure. A heat shield is attached to the bearing support structure. At least one fastener has a threaded body portion and an enlarged head portion, the threaded body portion to be inserted through aligned holes in the heat shield and the bearing support structure. A clip has a center opening that receives the threaded body portion such that the clip is positioned between the enlarged head portion and the heat shield.

In another embodiment according to the previous embodiment, the heat shield comprises a thin sheet metal plate having a radially outer edge portion defined by a circumferentially extending mount flange having a first side and a second side. The first side is in direct abutting engagement with the bearing support structure and the second side is in direct abutting engagement with the clip.

In another embodiment according to any of the previous embodiments, the fastener comprises a tee-head bolt.

In another embodiment according to any of the previous embodiments, the clip comprises a generally flat body portion defining the center opening and a plurality of gripping fingers extending outwardly from the flat body portion to grip the enlarged head portion of the tee-head bolt.

In another embodiment according to any of the previous embodiments, the enlarged head portion of the tee-head bolt includes a plurality of linear side edges. One gripping finger grips the enlarged head portion at each of the linear side edges.

In another embodiment according to any of the previous embodiments, each gripping finger includes a bent distal end that extends over an outward facing end face of the enlarged head portion.

In another embodiment according to any of the previous embodiments, the at least one bearing has at least first and second bearings respectfully supported by first and second bearing support structures, and includes a turbine exhaust case flange that is clamped between the first and second bearing support structures by the at least one fastener.

In another embodiment according to any of the previous embodiments, the heat shield has a first heat shield positioned between the clip and the first bearing support structure, and a second heat shield positioned between the second bearing support structure and a nut threaded onto the threaded body portion.

In another embodiment according to any of the previous embodiments, the bearing support structure includes a circumferentially extending groove. A portion of the clip is received within the groove.

In another featured embodiment, a method of installing a heat shield on a bearing support structure of a gas turbine engine includes the steps of providing a fastener having a threaded body portion and an enlarged head portion, and a clip having a center opening and a plurality of gripping fingers. A threaded body portion is inserted through the center opening in the clip and through aligned holes in the heat shield and bearing support structure such that the clip is positioned between the enlarged head portion and the heat shield and the gripping fingers grip the enlarged head portion. A nut is tightened on the threaded body portion to clamp the heat shield between the clip and the bearing support structure.

In another embodiment according to the previous embodiment, a circumferentially extending groove in the bearing support structure is provided. A portion of the clip is inserted within the groove to axially retain the clip, the fastener, and heat shield to the bearing support structure.

BRIEF DESCRIPTION OF THE DRAWINGS

The disclosure can be further understood by reference to the following detailed description when considered in connection with the accompanying drawings wherein.

DETAILED DESCRIPTION

Figure 1:
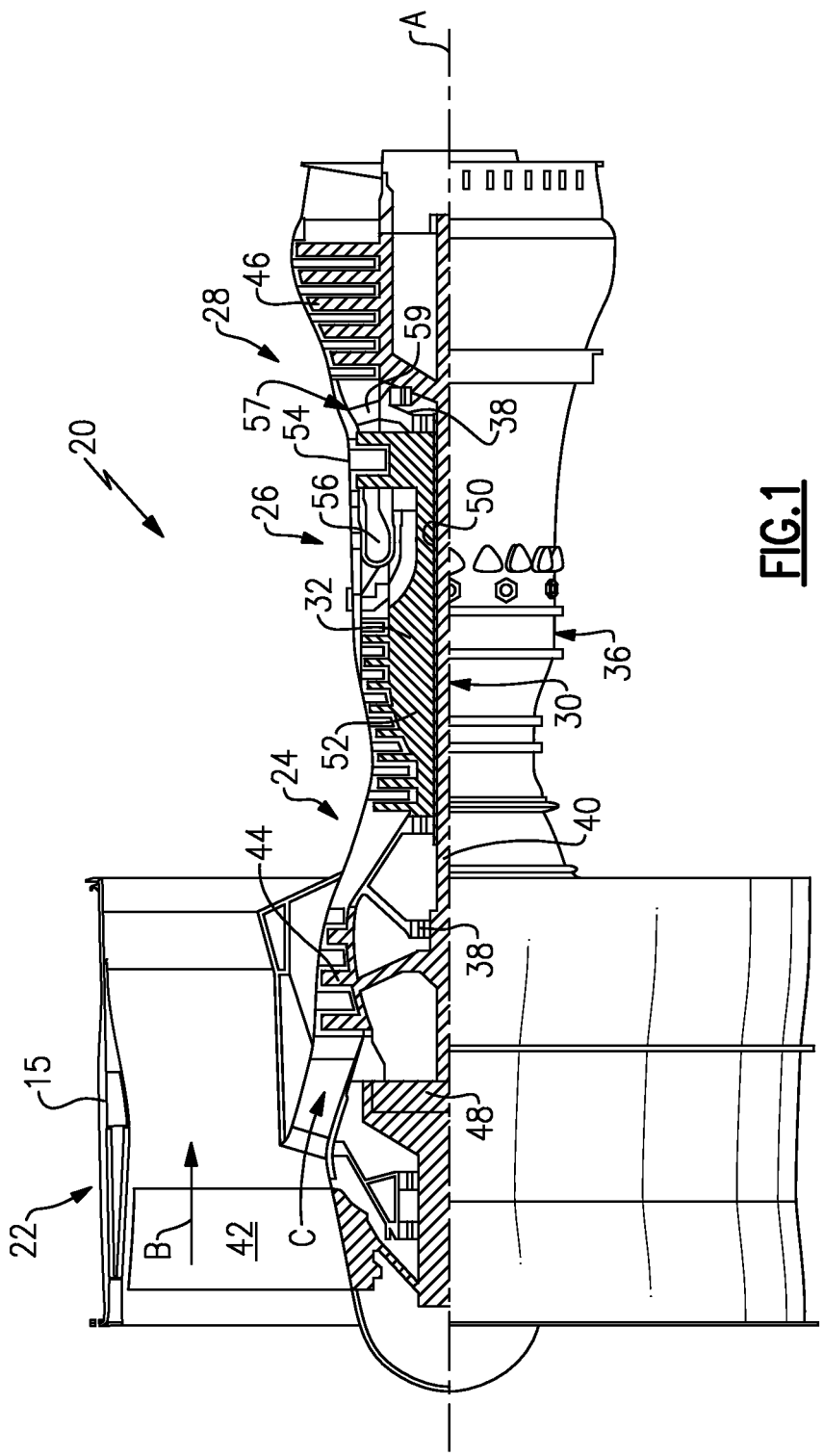
FIG. 1 schematically illustrates a geared turbofan engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 31 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compress section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second.

Figure 2:
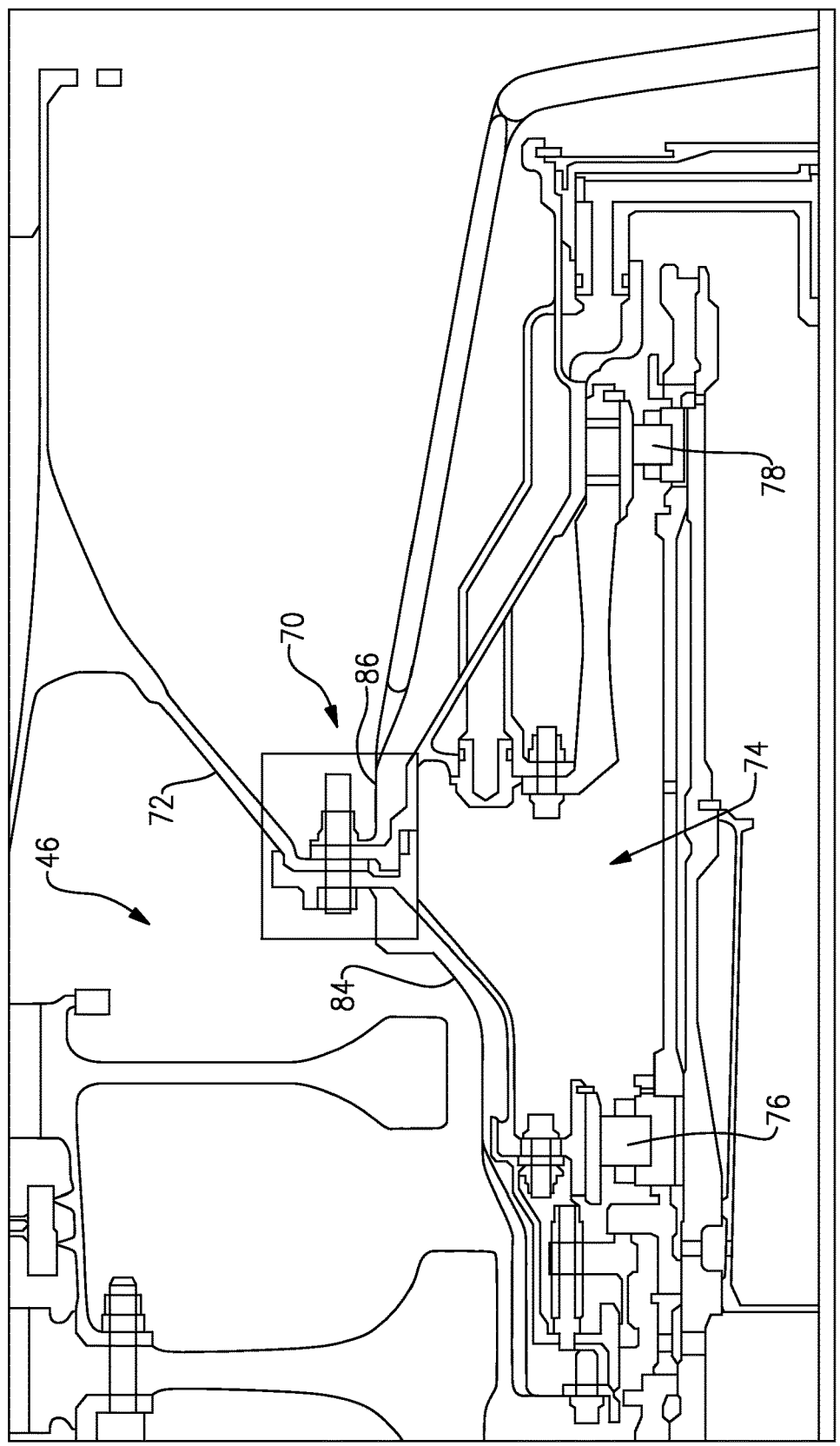
FIG. 2 is a schematic view of one section of the engine embodiment of FIG. 1 that utilizes the subject invention.

FIG. 2 shows an attachment interface 70 to a turbine exhaust case 72 that is positioned aft of the low pressure turbine section 46. A bearing compartment 74 includes at least a first bearing 76 and a second bearing 78 that rotatably support the spool 30 for rotation about the axis A. A first bearing support structure 80 supports the first bearing 76 and is attached to the non-rotating turbine exhaust case 72 at the attachment interface 70. A second bearing support structure 82 supports the second bearing 78 and is attached to the turbine exhaust case 72 at the attachment interface 70. A first heat shield 84 is positioned radially outward of the first bearing support structure 80 and a second heat shield 86 is positioned radially outward of the second bearing support structure 82. The first 84 and second 86 heat shields are also attached to the turbine exhaust case 72 at the attachment interface 70.

Figure 3:
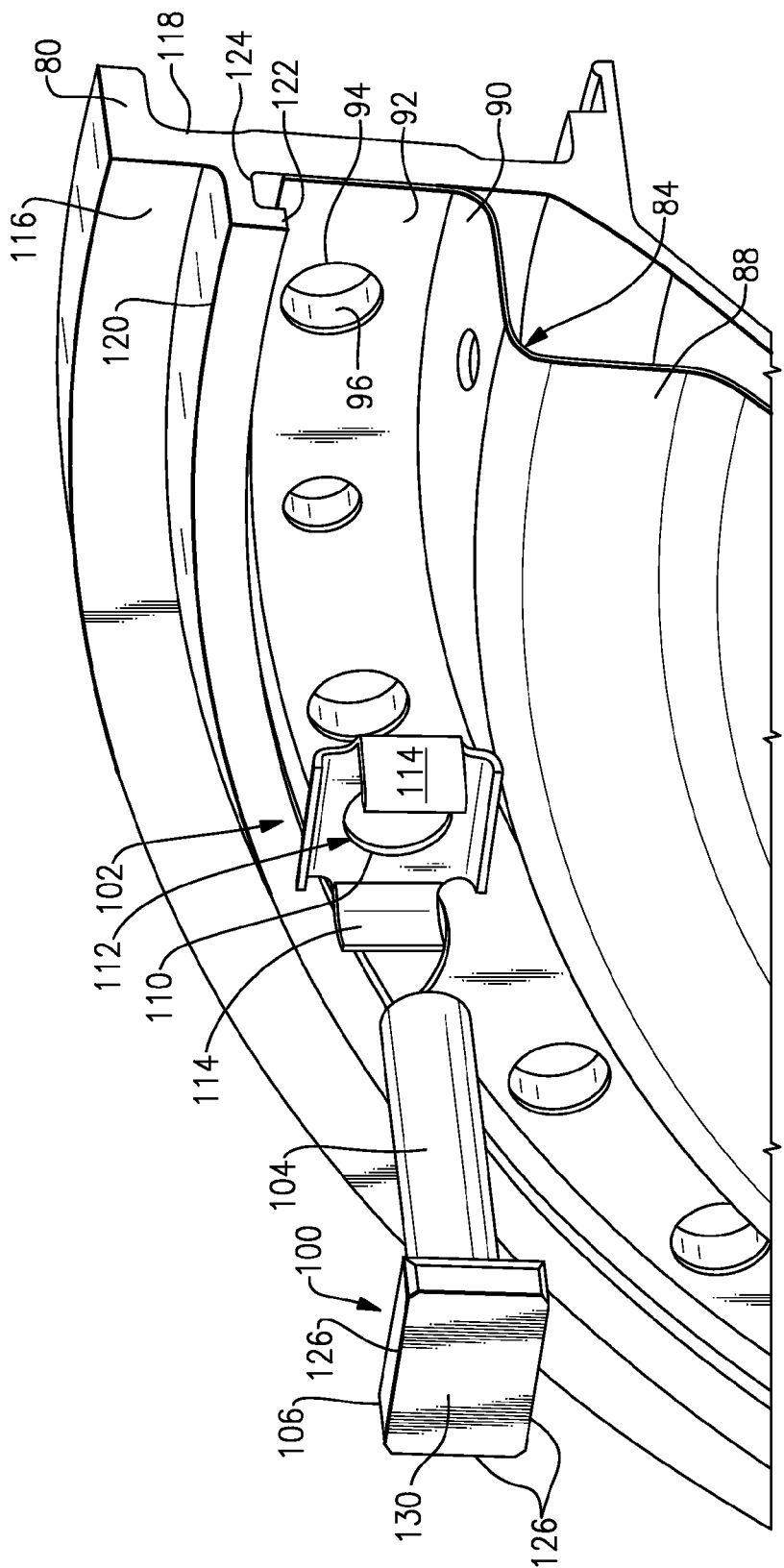
FIG. 3 is an exploded view of an attachment assembly for a heat shield.
Figure 5:
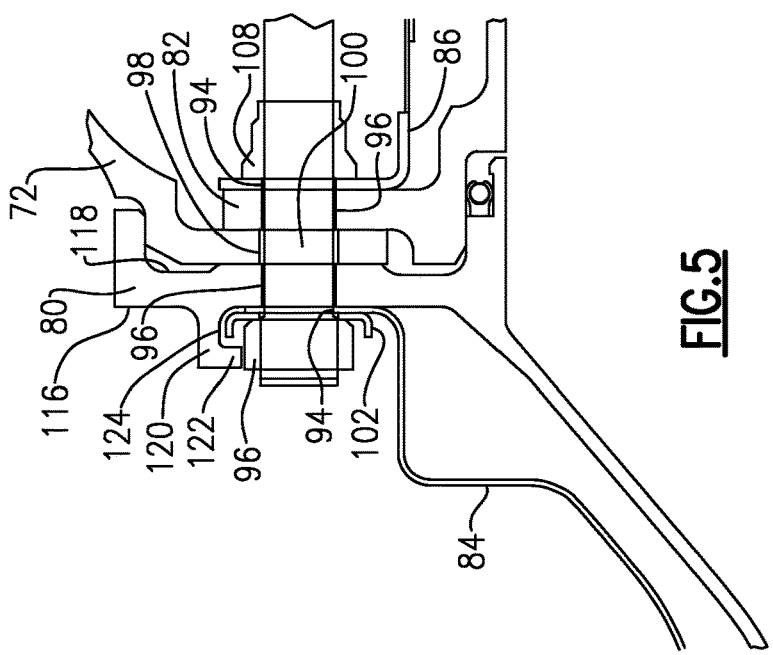
FIG. 5 is a cross-sectional side view of FIG. 4.

As shown in FIGS. 3 and 5, the first heat shield 84 and the second heat shield 86 are comprised of a thin sheet metal plate 88 having a radially outer edge portion 90. A mount flange 92 extends circumferentially about the radially outer edge portion 90 and includes a plurality of holes 94. As shown in FIG. 3, the holes 94 of the first heat shield 84 are aligned with a plurality of holes 96 formed in the first bearing support structure 80. The turbine exhaust case 72 also includes corresponding holes 98 (FIG. 5) that align with the holes 94 in the first 84 and second 86 heat shields.

Each of the aligned sets of holes 94, 98 receives a fastener assembly that includes a fastener 100 and a clip 102 (FIG. 3). The fastener 100 has a threaded body portion 104 and an enlarged head portion 106. The threaded body portion 104 is inserted through the aligned holes 94, 98 and a nut 108 is threaded onto an end of the threaded body portion 104. The clip 102 comprises a generally flat body portion 110 that includes a center opening 112 and which includes a plurality of gripping fingers 114 extending outwardly from the flat body portion 110 to grip the enlarged head portion 106. The center opening 112 receives the threaded body portion 104 such that the flat body portion 110 is positioned between the enlarged head portion 106 and the heat shield 84.

The first bearing support structure 80 includes a first end face 116 that faces the first heat shield 84 and a second end face 118 that faces the second heat shield 86. A ledge 120 extends outwardly from the first end face 116 of the support structure 80. The ledge 120 transitions into a lip 122 that extends radially inward from a distal end of the ledge 120. The lip 122 is spaced from the first end face 116 by a gap such that a circumferentially extending groove 124 is formed in the first bearing support structure 80. A portion of the clip 102 is received within the groove 124 to axially retain the clip 102, the fastener 100, and the heat shield 84 to the bearing support structure 80. In the example shown in FIG. 3, one of the gripping fingers 114 is received within the groove 124.

Figure 4:
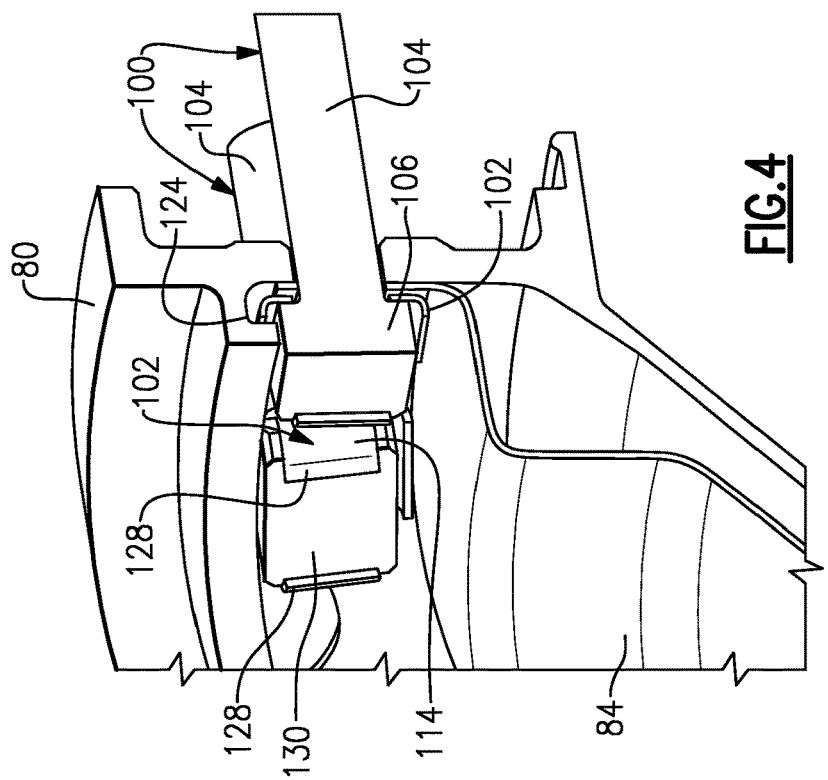
FIG. 4 is a perspective view of the attachment assembly of FIG. 3 in an installed position.

In one example, the fastener 100 comprises a tee-head bolt. In this example, the enlarged head portion 106 includes a plurality of linear side edges 126 and the clip 102 includes one gripping finger 114 to grip the enlarged head portion 106 at each of the linear side edges 126. Each gripping finger 114 includes a bent distal end 128 (FIG. 4) that extends over an outward facing end face 130 of the enlarged head portion 106.

As shown in FIG. 5, the method of installing the heat shield 84 on the bearing support structure 80 includes the steps of inserting the threaded body portion 104 of the fastener 100 through the corresponding center opening 112 in the associated clip and through aligned holes 94, 98 in the heat shields 84, 86, bearing support structures 80, 82, and turbine exhaust case 72 such that the clip 102 is positioned between the associated enlarged head portion 106 and the first heat shield 84, and the gripping fingers 114 grip the enlarged head portion 106. A portion of the clip 102 is inserted into the groove 124 such that the clip 102, the fastener 100, and the heat shield are axially retained to the bearing support structure. The nut 108 is tightened on the threaded body portion 104 to clamp the heat shields to the bearing support structures, with the clip 102 being clamped between the enlarged head portion 106 and the first bearing support structure 80. This is repeated for each fastener 100 of the attachment interface 70 (FIG. 2).

Thus, the fastener and clip cooperate to capture the heat shield to the bearing mount structure during a blind assembly operation. The clip protects the heat shield from sharp edges of the enlarged bolt head, and since the clip does not rotate during assembly, there is no damage to the thin sheet metal that forms the shields. Once the fastener is completely installed, the heat shields are firmly held in place. The fastener and clip provide a low-cost installation solution for thin sheet metal heat shields that is maintained for the full life of the associated parts.

In the examples shown, the tee-head bolt and clip have been used to mount heat shields to a bearing support structure and turbine exhaust case. It should be understood that the bolt and clip could be used to mount heat shields at other locations within the engine. Further, the bolt and clip could be used to capture other engine components to a static structure as needed.

Although an example embodiment has been disclosed, a worker of ordinary skill in this art would recognize that certain modifications would come within the scope of the claims. For that reason, the following claims should be studied to determine their true scope and content.

What is claimed is:

1. A method of installing a heat shield for a bearing compartment defined between first and second bearing support structures of a gas turbine engine comprising the steps of:
  (a) providing a fastener having a threaded body portion and an enlarged head portion, and a clip having a center opening and a plurality of gripping fingers;
  (b) inserting the threaded body portion through the center opening in the clip and through aligned holes in the heat shield and first and second bearing support structures such that the clip is positioned between the enlarged head portion and the heat shield and the gripping fingers grip the enlarged head portion;
  (c) providing at least one of the first and second bearing support structures with an end face having a ledge that extends axially outwardly from the end face and transitions into a lip that extends radially inward from a distal end of the ledge to form a circumferentially extending groove in at least one of the first and second bearing support structures, and inserting a portion of the clip within the groove to axially retain the clip, the fastener, and the heat shield to the first and second bearing support structures; and (d) tightening a nut on the threaded body portion to clamp the heat shield between the clip and the bearing support structure.

2. The method according to claim 1 wherein the heat shield comprises a first heat and a second heat shield, and including positioning the first heat shield between the clip and the first bearing support structure, and positioning the second heat shield between the second bearing support structure and a nut threaded onto the threaded body portion.

3. The method according to claim 1 wherein the heat shield comprises a thin sheet metal plate having a radially outer edge portion extending about the plate and including a mount flange extending about the radially outer edge portion, and wherein the radially outer edge portion first extends in an axial direction and then terminates at the mount flange which extends in a radial direction, and including aligning the mount flange with a turbine exhaust case flange and first and second flanges respectively of the first and second bearing support structures such that the fastener clamps the heat shield and the first and second flanges to the turbine exhaust case flange.

4. An attachment interface assembly for a gas turbine engine comprising:
   a heat shield configured for attachment to an engine static structure, wherein the heat shield comprises a heat shield body having a radially outer edge portion extending about the heat shield body and including a mount flange extending about the radially outer edge portion;
   a fastener having a threaded body portion and an enlarged head portion, the threaded body portion to be inserted through aligned holes in the heat shield and engine static structure;
   a clip having a center opening that receives the threaded body portion such that the clip is positioned between the enlarged head portion and the heat shield, and wherein a first side of the mount flange is in engagement with the engine static structure and a second side of the mount flange is in engagement with the clip; and
   wherein the engine static structure includes an end face with a ledge that extends axially outwardly from the end face and transitions into a lip that extends radially inward from a distal end of the ledge to form a circumferentially extending groove, and wherein a portion of the clip is received within the groove to axially retain the clip, the fastener, and the heat shield to the engine static structure.

5. The assembly according to claim 4 wherein the clip comprises a generally flat body portion defining the center opening and which includes a plurality of gripping fingers with bent distal ends to grip the enlarged head portion, and wherein at least two bent distal ends extend over an outward facing end face of the enlarged head portion to engage the outward facing end face.

6. The assembly according to claim 4 wherein the fastener comprises a tee-head bolt.

7. The assembly according to claim 4 wherein the heat shield body comprises a thin sheet metal plate surrounded by the radially outer edge portion, and wherein the radially outer edge portion first extends in an axial direction and then terminates at the mount flange which extends in a radial direction, and wherein the first side is in direct abutting engagement with the engine static structure and the second side is in direct abutting engagement with the clip.

8. An attachment interface assembly for a gas turbine engine comprising:
   a heat shield configured for attachment to an engine static structure, wherein the heat shield comprises a heat shield body having a radially outer edge portion extending about the heat shield body and including a mount flange extending about the radially outer edge portion, wherein the heat shield body comprises a thin sheet metal plate surrounded by the radially outer edge portion, and wherein the radially outer edge portion first extends in an axial direction and then terminates at the mount flange which extends in a radial direction;
   a fastener having a threaded body portion and an enlarged head portion, the threaded body portion to be inserted through aligned holes in the heat shield and engine static structure; and
   a clip having a center opening that receives the threaded body portion such that the clip is positioned between the enlarged head portion and the heat shield, wherein the clip comprises a generally flat body portion defining the center opening and which includes a plurality of gripping fingers that each extend in a direction toward the enlarged head portion, and wherein a first side of the mount flange is in direct abutting engagement with the engine static structure and a second side of the mount flange is in direct abutting engagement with the clip, and wherein the engine static structure comprises a bearing support structure that includes a support mount flange, and wherein the heat shield body is positioned radially outward of the bearing support structure and extends to the mount flange; and
   a nut threaded onto the threaded body portion to clamp the clip and the mount flange of the heat shield between the enlarged head portion and the support mount flange of the bearing support structure.

9. The assembly according to claim 8 wherein the enlarged head portion includes a plurality of linear side edges, and wherein the plurality of gripping fingers extend outwardly from the flat body portion to bent distal ends, and wherein at least two bent distal ends extend over an outward facing end face of the enlarged head portion.

10. The assembly according to claim 9 wherein each gripping finger of the plurality of gripping fingers includes a bent distal end that extends over an outward facing end face of the enlarged head portion.

11. A gas turbine engine assembly comprising:
   at least one shaft defining an engine axis of rotation;
   at least one compressor and at least one turbine connected to each other by the at least one shaft;
      at least first and second bearings supporting the at least one shaft for rotation about the engine axis of rotation, the first and second bearings positioned with a bearing compartment including a first bearing support structure and a second bearing support structure extending aft of the first bearing support structure;
   at least one heat shield attached to at least one of the first and second bearing support structures;
   at least one fastener having a threaded body portion and an enlarged head portion, the threaded body portion to be inserted through aligned holes in the heat shield and the first and second bearing support structures; and
   a clip having a center opening that receives the threaded body portion such that the clip is positioned between the enlarged head portion and the heat shield, and wherein the clip includes a flat body portion and a plurality of gripping fingers that each extend in a direction toward the enlarged head portion.

12. The gas turbine engine assembly according to claim 10 wherein the heat shield comprises a thin sheet metal plate having a radially outer edge portion extending about the thin sheet metal plate and including a mount flange extending about the radially outer edge portion, the mount flange having a first side and a second side, and wherein the first side is in direct abutting engagement with the at least one of the first and second bearing support structures and the second side is in direct abutting engagement with the clip.

13. The gas turbine engine assembly according to claim 12 wherein the fastener comprises a tee-head bolt.

14. The gas turbine engine assembly according to claim 13 wherein the flat body portion defines the center opening and wherein the plurality of gripping fingers extend outwardly from the flat body portion such that at least two gripping fingers grip the enlarged head portion of the tee-head bolt.

15. The gas turbine engine assembly according to claim 14 wherein the enlarged head portion of the tee-head bolt includes a plurality of linear side edges, and wherein the plurality of gripping fingers extend outwardly from the flat body portion to bent distal ends, and with at least one gripping finger of the plurality of gripping fingers grips the enlarged head portion at each gripping one of the linear side edges and at least one gripping finger of the plurality of gripping fingers being received with a groove formed within an end face of the one of the first and second bearing support structures.

16. The gas turbine engine assembly according to claim 14 wherein at least two bent distal ends extend over an outward facing end face of the enlarged head portion to engage the outward facing end face.

17. The gas turbine engine assembly according to claim 12 including a turbine exhaust case flange that is clamped between the first and second bearing support structures by the at least one fastener.

18. The gas turbine engine assembly according to claim 17 wherein the heat shield comprises a first heat shield positioned between the clip and the first bearing support structure, and including a second heat shield positioned between the second bearing support structure and a nut threaded onto the threaded body portion.

19. The gas turbine engine assembly according to claim 11 wherein the at least one of the first and second bearing support structures includes an end face with a ledge that extends axially outwardly from the end face and transitions into a lip that extends radially inward from a distal end of the ledge to form a circumferentially extending groove, and wherein a portion of the clip is received within the c groove.

20. The gas turbine engine assembly according to claim 11 wherein the heat shield comprises a thin sheet metal plate having a radially outer edge portion extending about the thin sheet metal plate and including a mount flange extending about the radially outer edge portion, and wherein the radially outer edge portion first extends in an axial direction and then terminates at the mount flange which extends in a radial direction.

21. An attachment interface assembly for a gas turbine engine comprising:
 a heat shield configured for attachment to an engine static structure, wherein the heat shield comprises a heat shield body having a radially outer edge portion extending about the heat shield body and including a mount flange extending about the radially outer edge portion;
 a fastener having a threaded body portion and an enlarged head portion, the threaded body portion to be inserted through aligned holes in the heat shield and engine static structure; and
 a clip having a center opening that receives the threaded body portion such that the clip is positioned between the enlarged head portion and the heat shield, and wherein a first side of the mount flange is in engagement with the engine static structure and a second side of the mount flange is in engagement with the clip, and wherein the engine static structure comprises a first bearing support structure that includes a first support mount flange and a second bearing support structure that extends aft of the first bearing support structure and includes a second support mount flange, and wherein the heat shield comprises a first heat shield positioned radially outward of the first bearing support structure and which extends to the mount flange, and including a second heat shield positioned radially outward of the second bearing support structure and which extends to a second mount flange, and wherein the fastener secures the clip, the mount flange of the first heat shield and the second mount flange of the second heat shield to the first and second support mount flanges to form the attachment interface assembly.

22. The assembly according to claim 21 wherein the first bearing support structure mounts a first bearing and the second bearing support structure mounts a second bearing such that a bearing compartment is formed between the first and second bearing support structures.

\* \* \* \* \*